May 1, 1934.　　　O. F. STAFFORD　　　1,957,364
CARBONIZING PROCESS AND APPARATUS
Filed Sept. 20, 1926
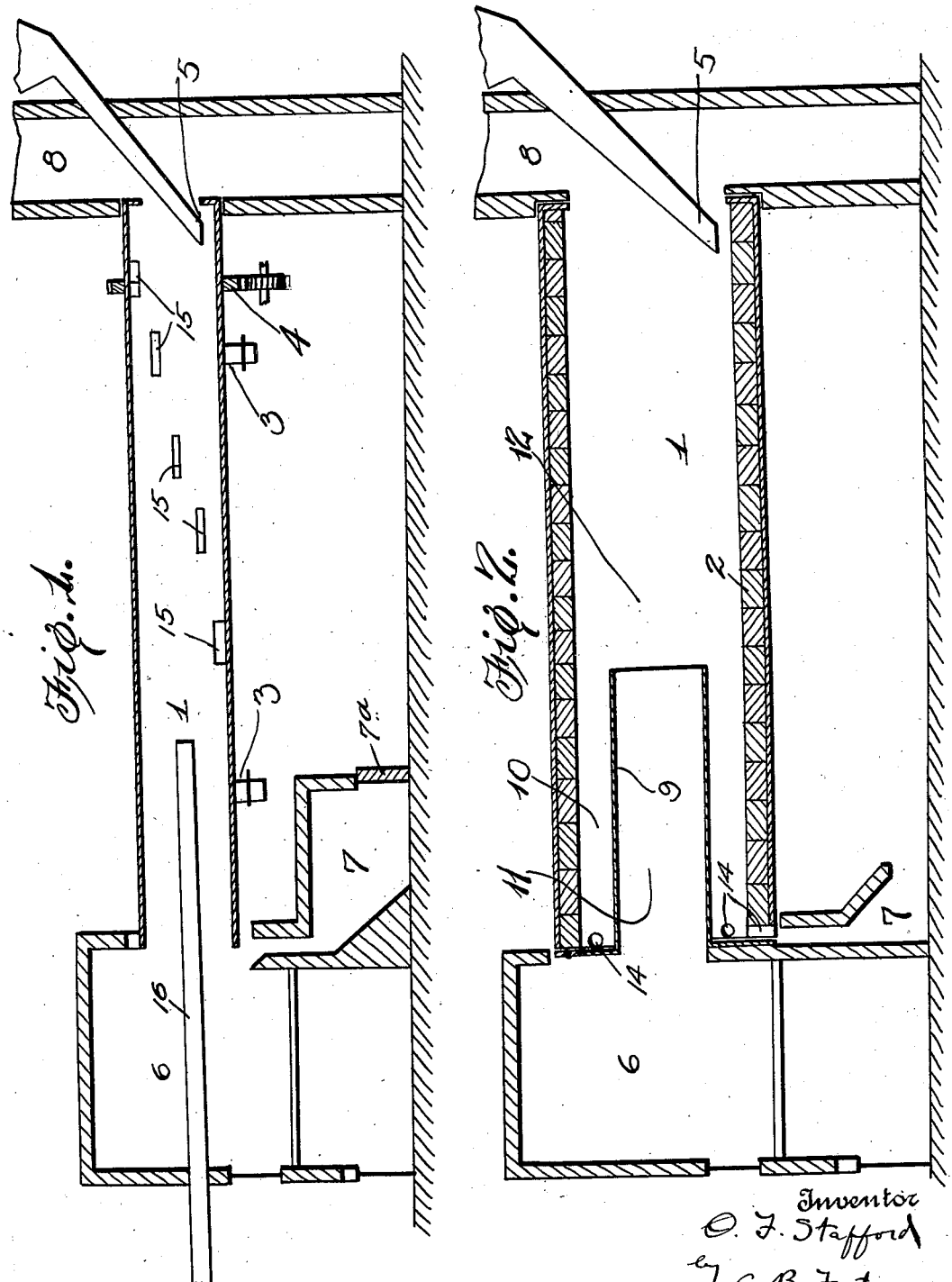
Inventor
O. F. Stafford
by A. B. Foster
Attorney Patented May 1, 1934

1,957,364

UNITED STATES PATENT OFFICE 1,957,364

CARBONIZING PROCESS AND APPARATUS

Orin F. Stafford, Eugene, Oreg.

Application September 20, 1926, Serial No. 136,700

9 Claims. (Cl. 202—6)

This invention relates to manufacturing solid carbonized residues from materials of vegetable or animal origin and in the form of small pieces or powder or granules such as wood in small pieces, nut shells, seed hulls, corn cobs, fruit pits, organic fibrous materials, peat, lignite, non-coking coal, bones, leather scrap, and the like or mixtures including one or more of them, especially under conditions where it is not desired to recover volatile carbonization products as such, but upon the other hand to utilize such products as fuel at the moment of their formation. In such a process certain conditions are necessary if the manufacturing operation is to be expeditious and economical.

Many proposals have been made leading to desirable economies in the art of carbonizing materials of the kind characterized and specified above, and many of these proposals have been incorporated into practice. After much experience in the art of destruction distillation I have devised a procedure for achieving the purpose indicated above, namely, the carbonizing of materials of vegetable or animal origin or both as enumerated, without recovery of volatile carbonization products, but with simultaneous utilization of a large part at least of such volatile products for their fuel value, this procedure representing a material simplification and improvement over any present practice known to me.

The procedure in question consists, in its primitive form, in passing the material to be carbonized through an oven or kiln preferably of the rotary type, in such a way that the material comes into contact with a current of hot furnace gases still containing enough free oxygen to burn the vaporous products evolved in the carbonizing step. The heat content of such current of hot gases is suitably controlled so as to effect the carbonization desired, and the temperature of the current of such gases is preferably high enough to bring about the ignition, in the oven or kiln itself, of the volatile carbonization products, the combustion of which thereby produce heat to aid in the process and thereby effect substantial operating economies.

The annexed drawing show vertical sections of two rotary kiln apparatuses suitable for carrying out the process. Fig. 1 is a simple apparatus, and Fig. 2 is a more highly developed type of device.

The process of my invention is made clear by reference to Fig. 1, of the annexed drawing where 1 is a metal cylinder which may be lined with refractory material if desired, and which is provided with means for rotating it, as by use of the roller supports and rings 3 and the girth gear and accessories 4. At 5, any suitable means is provided for feeding the material to be carbonized, in the relatively fine condition as indicated above. Distributed through the length of the kiln if of the rotary type, are suitably designed wall projections (for example lifting blades 15, attached to the inner wall of the kiln), which act as lifting baffles and so effect the thorough agitation of the material undergoing carbonization in such a way that it is repeatedly agitated and exposed to the hot gases contained in the kiln. Any lumps will usually be largely broken up by this operation. At 6 is indicated a furnace designed to furnish the necessary initial supply of hot gases for the operation. This furnace is equipped with draft and fuel controls suitable for the duty it is to perform. A receptacle for the solid carbonization product is indicated at 7. This may have a door 7a, if desired.

In practice the material is fed into the kiln at 5 and by virtue of the motion of the appliance and its inclination, travels toward the outlet end of the kiln. As it comes into contact with hot gases the material first is dried, then is raised to a temperature at which carbonization takes place. The combustible gaseous and vaporous products, being in general more easily ignited than the solid carbonaceous residue, are kindled and burn to a greater or less extent in the kiln, contributing their heat of combustion to the heat requirements of the process. The exothermic reaction of the destructive distillation also aids in furnishing some of the heat requirements of the process. The solid carbonaceous residue for the great part does not burn and is discharged in due time into chamber 7 from which it may be removed as desired. All gaseous combustion products, moisture, etc., escape through stack 8.

The process as above described is more simple than any known to me in the prior art effecting the rapid, complete and economical carbonization of materials such as have been enumerated.

However, since the gases from the furnace 6 inevitably contain an excess of oxygen which, in the process as described, reacts not only with the volatile or gaseous combustible carbonization products as they form but also to some extent with the solid carbonaceous residue, I have invented a modification of the simple appliance of Fig. 1, which practically avoids such combustion of solid residue, thereby increasing the yield of this valuable product.

The modification in question may be merely an internal shield made substantially concentric with the walls of the kiln for a distance beginning at the discharge end of the kiln. In Fig. 2 of the drawing this modification is made clear. In said figure, 1 is the rotary kiln having supporting and driving accessories (not shown), 2 is a refractory lining which may be provided therein, 6 is the furnace, 7 the charcoal receptacle, 5 a feeding device. In this figure however, attention is called to the shield 9 which is the essential constructional feature comprising the modification under discussion. This shield may be formed of sheet iron and separates the lower end of the kiln into an outer compartment 10 and an inner flue 11, so arranged that hot furnace gases only are in the space 11 while the material undergoing carbonization is in the space 10 and so separated from oxygen-containing hot gases.

In other respects the appliance is similar to that described in connection with Fig. 1, due provision (e. g. holes 14) being made, as above, for the discharge of charcoal and the like from the dead end of space 10 into the receiver 7.

The operation of the process and appliance as exemplified in Fig. 2 is as follows: Material fed into the kiln at 5 is first dried by the action of hot gases, and then is heated to the point of rapid carbonization.

By the time this point has been reached the material has progressed in the kiln to where it enters space 10 so that during the carbonization period and thereafter, the solid carbonization product is protected from an atmosphere containing an objectionable amount of free oxygen. The carbonization continues to completion, nevertheless, owing to the exothermic reaction heat concerned aided as need be by heat transmitted through the shield 9 which should preferably be made of heat conducting material. The combustible volatile products of the carbonization emerge from the space 10 at the terminal edge of the shield 9, and there combine with excess oxygen carried by the furnace gases, producing heat for use in the process. It is seen that essentially, with this modification of the process, the region 12 of the kiln becomes a blowpipe for the utilization of combustible volatile carbonization products. With either modification of the kiln it is of course possible to carry the material parallel with the current of hot furnace gases instead of counter to the current as indicated and described.

In the form of apparatus used to carry on this process it obviously is preferable to supply the oxygen necessary for combustion in the kiln in the form of excess oxygen in the furnace gases. It is, however, possible, and in some instances may be desirable, to admit the oxygen to the combustion zone of the kiln in some other manner, as by an air duct entering into such zone, the air duct perhaps passing through the furnace for preheating the air. Such an air duct is shown at 16, in Fig. 1.

I claim:

1. An apparatus for carbonization of organic matter in a relatively fine state which comprises a rotary kiln, a furnace delivering hot gaseous products of combustion into one end thereof, a feed for such organic material to the higher end of the said kiln, a substantially cylindrical shield located within the lower end of said kiln and extending a substantial distance thereinto, said shield dividing the lower end of the kiln into an annular compartment and a heating flue located within said annular compartment and means for projecting hot products of combustion into the kiln through said heating flue, and separate means for the discharge of solid products of carbonization from said annular compartment.

2. A process of carbonizing solid relatively fine organic materials of the kind herein described consisting in passing the material as a downwardly inclined agitated flowing stream in contact with a counter-flowing current of hot furnace gases of an oxidizing character in such a manner that the combustible volatile carbonization products are kindled and burn in said oxidizing gases, and contribute their heat of combustion to the operation, solid carbonaceous residues remaining for the greater part unburned and being obtained as a product, the said solid organic material being passed into a compartment of the kiln in which contact of air with the solid material under treatment is largely prevented, and in which the said organic material is further heated by indirect heating, whereby carbonization is effected but combustion of the carbonized product is prevented.

3. An apparatus for carbonization of organic matter in a relatively fine state which comprises a rotary kiln, a furnace delivering hot gaseous products of combustion into one end thereof, a feed for such organic material to the higher end of said kiln, a substantially cylindrical shield carried by said kiln and extending therein for a substantial distance, and rotating therewith and dividing the lower end of the kiln into an annular compartment and a heating flue located within said annular compartment and means for projecting hot products of combustion into the kiln through said heating flue, and separate means for the discharge of solid products of carbonization from said annular compartment.

4. A process of carbonizing relatively fine solid carbonaceous organic material capable of undergoing exothermic pyrolysis, which comprises introducing such solid material into the upper end of an inclined rotary kiln, and allowing passage thereof downwardly through said kiln, introducing a counter-flowing current of strongly heated gases capable of supporting combustion, at the lower end of the kiln, shielding the carbonaceous material in and near the lower end only of the kiln from direct contact with said hot combustion supporting gases, while allowing ready transfer of heat from said hot gases to said carbonaceous material during such stage, effecting combustion of the volatile products of pyrolysis in said kiln whereby the heat produced by such combustion aids in heating the solid material in said kiln, and withdrawing the solid products of carbonization from said shielded heating step, to a cooling zone.

5. A process of treating solid organic material capable of undergoing exothermic pyrolysis, while in a comminuted state, which comprises introducing such material in a substantially continuous manner into the upper end of an inclined kiln, introducing hot gases carrying free oxygen into the lower end of said kiln, allowing said introduced solid material to travel through said kiln toward its lower end, cutting off free access of said gases to said solid material as the same reaches a temperature near that at which the exothermic reaction takes place rapidly, and continuing to heat said solid material by said hot gases without free contact between said solid material and said hot gases, and allowing the volatile products of said pyrolysis to burn in the kiln and to impart their heat of combustion to said solid material in said kiln, and withdrawing the solid products of pyrolysis from said kiln to a cooling zone.

6. A process of carbonizing solid materials selected from the herein described group consisting of comminuted wood, nut shells, seed hulls, corn cobs, fruit pits, organic fibrous materials, peat, bones, and leather scrap, consisting in passing such material through a rotary kiln in counter current contact with hot furnace gases consisting essentially of products of combustion and containing free oxygen, said hot furnace gases being sufficiently hot to produce exothermic pyrolysis of said solid materials, to cause liberation of volatile combustible carbonization products and a solid residual carbonization product, the combustible volatile products of carbonization, but not the solid material, being burned in the kiln substantially as they may be generated by gases containing free oxygen entering at the discharge end of the kiln, the carbonization operation being conducted while said material is out of free contact with gases containing objectionable amounts of free oxygen, the said material being heated by the incoming furnace gases containing free oxygen, while out of direct contact therewith, aided by the heat generated in the exothermic carbonization reaction.

7. A process of carbonizing solid materials consisting in large part at least of cellulosic and ligneous constituents, consisting in passing such material through a rotary kiln in counter current contact with hot furnace gases consisting essentially of products of combustion and containing free oxygen, said hot furnace gases being sufficiently hot to produce exothermic pyrolysis of said solid materials, to cause liberation of volatile combustible carbonization products and a solid residual carbonization product, the combustible volatile products of carbonization, but not the solid material, being burned in the kiln substantially as they may be generated, the latter part of the carbonization operation being conducted while said material is out of free contact with gases containing objectionable amounts of free oxygen, the said material being heated by the incoming furnace gases containing free oxygen, while out of direct contact therewith, aided by the heat generated in the exothermic carbonization reaction, said gases being introduced at the discharge end of the kiln.

8. A process of carbonizing solid relatively fine organic materials of the kind above specified, consisting in passing such material through a rotary kiln in counter-current contact with hot furnace gases containing free oxygen, the combustible volatile products of carbonization, but not the solid material, being burned in the kiln substantially as they may be generated, by air introduced substantially entirely at the outlet end of the kiln, the last part of the carbonization operation being conducted while said material is out of free contact with gases containing objectionable amounts of free oxygen, the said material being heated by the incoming furnace gases containing free oxygen, while out of direct contact therewith, aided by the heat generated in the exothermic carbonization reaction.

9. An apparatus for carbonization of organic matter in a relatively fine state which comprises a rotary kiln, a furnace delivering hot gaseous products of combustion into one end thereof, a feed for such organic material to the higher end of said kiln, a substantially cylindrical shield carried in the outlet end of said kiln and extending therein for a substantial distance and dividing the lower end of the kiln into an annular compartment and a heating flue located within said annular compartment and means for projecting hot products of combustion into the kiln through said heating flue, and separate means for the discharge of solid products of carbonization from said annular compartment.

ORIN F. STAFFORD.